No. 733,149. PATENTED JULY 7, 1903.
P. E. CHAPMAN.
METHOD OF CHANGING THE FREQUENCY OF SINGLE PHASE
INDUCTION MOTORS.
APPLICATION FILED APR. 15, 1902.
NO MODEL.
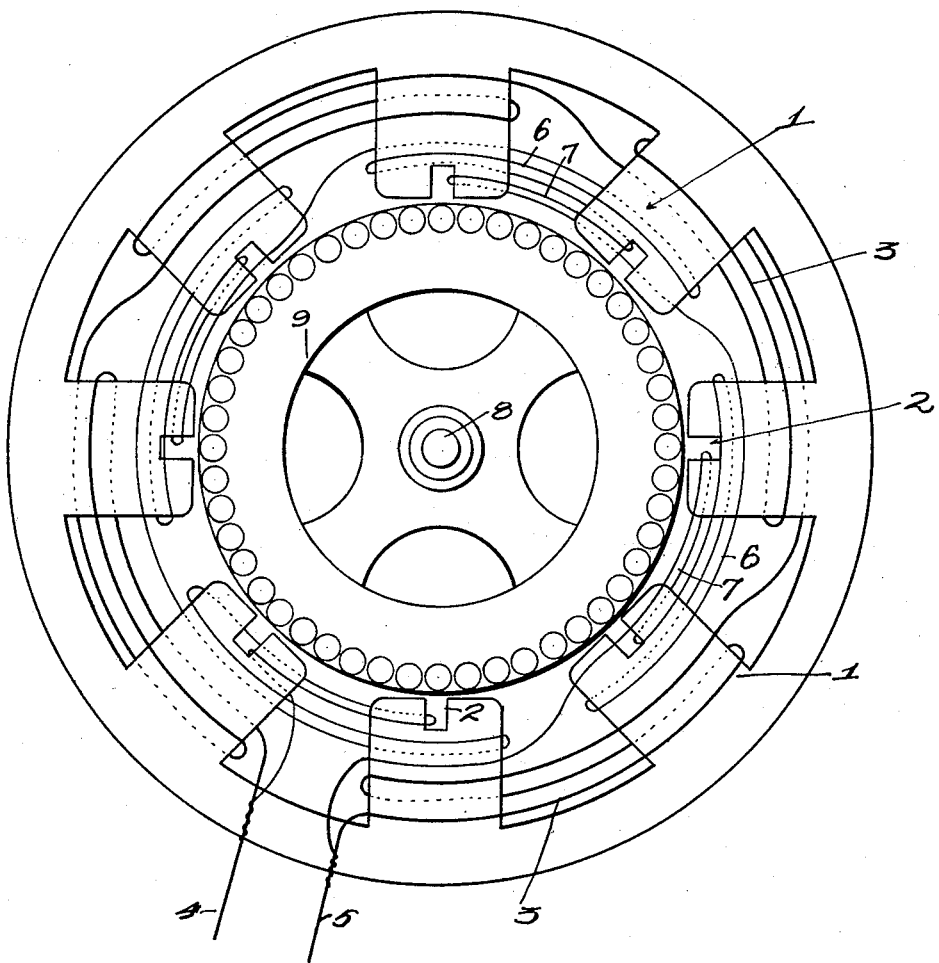

No. 733,149. Patented July 7, 1903.

UNITED STATES PATENT OFFICE.

PENROSE E. CHAPMAN, OF ST. LOUIS, MISSOURI.

METHOD OF CHANGING THE FREQUENCY OF SINGLE-PHASE INDUCTION-MOTORS.

SPECIFICATION forming part of Letters Patent No. 733,149, dated July 7, 1903.

Application filed April 15, 1902. Serial No. 103,054. (No model.)

*To all whom it may concern:*

Be it known that I, PENROSE E. CHAPMAN, of the city of St. Louis, State of Missouri, have invented certain new and useful Improvements in Changing the Frequency of Single-Phase Induction-Motors, of which the following is a full, clear, and exact description, reference being had to the accompanying drawing, forming a part hereof.

My invention relates to changing the frequency of single-phase induction-motors.

My object is to render possible a reduction in frequency in small induction-motors, such as fan-motors, of, say, from sixteen thousand alternations to seven thousand two hundred alternations, whereby large numbers of fan-motors of high frequency may be changed to lower frequency, and thereby be made more valuable. At the present time small fan-motors of sixteen thousand alternations are worth little more than "junk" on the market, because of the universal change in frequency now being made from a higher to a lower frequency by the electrical central stations in the United States and other countries.

My invention consists of two or more "phase" or "teaser" coils, one placed, preferably, within the other, in combination with the main coils, either wound around one or several polar projections and connected in series with each other, said phase-coils being of higher resistance than the main coils and leading the latter in phase.

My invention consists, further, of the details of construction hereinafter described and claimed.

The drawing is a diagrammatic view of a single-phase self-starting induction-motor of the "split-phase" type.

1 indicates the usual bifurcated field polar projections, provided with the slots 2 and carrying the main coils 3 and the latter connected in series and provided with the usual circuit connections 4 and 5.

I am aware that the usual slotted types of fields used in alternating-current motors are interchangeable in frequency by simply spacing the winding properly for the various frequencies, but am not aware that machines possessing poles similar to direct-current machines have been or could be changed in frequency by rewinding or any other method not affecting the shape of pole and general construction, (although changing the number of magnetic poles,) the principal difficulties encountered being as follows: first, a too-great change in speed if the number of magnetic poles remain the same; second, inability to come up to speed when several polar projections are thrown together, forming one magnetic pole, the motor having a decided tendency to run at a speed somewhere between one-quarter and one-third full speed, depending on method of starting, load, &c., after having received its initial start.

My invention renders possible a change of frequency in machines possessing polar projections similar to the usual D. C. pole in distinction to those possessing slotted or subdivided poles similar to slotted armatures and "polyphase" apparatus. The slots of the poles may of course be of greater or less depth and located either centrally or otherwise relative to the poles. Heretofore when a machine of this type has had two or more of its polar projections connected to form a single pole, and thereby lower the frequency upon which the machine is adapted to operate, or to increase the speed, and any of the usual starting devices are used, the machine has been enabled to readily start; but it has "hung up" in speed and refused to come up to its normal running speed. I overcome this difficulty by applying to the poles 1 two or more phase or teaser coils 6 and 7, one within the other, in combination with the main coils 3 and either wound around one or several polar projections, preferably as shown, and connected, preferably, in series with each other, said phase coils being of higher resistance and lower self-induction than the main coils, the currents in same consequently leading in phase those in the main coils. The inner and generally the smaller phase-coil 7 is preferably placed within the pole-slots 2 and extends from one horn or projection to a horn or projection of the next adjacent pole, the larger phase-coil 6 completely encircling the same two poles which carry said smaller phase-coil and whereby said larger phase-coil will of course inclose a greater polar surface.

8 indicates the armature-shaft, and 9 the usual armature used in this class of motors.

While it might be possible to start and bring to speed motors by a combination phase-leading coil and another phase-lagging coil, one within the other, the combination described above of a phase-coil around the extension-horns of the magnetic poles with a large one around a portion of each of two adjacent magnetic poles (in other words, displaced ninety degrees or a little less) will give the best and most efficient results. This displacement is mechanical, the angles referred to being those corresponding to the bipolar fields, as is usual in electrical-phase measurements.

What I claim is—

In induction-motors having poles similar to direct-current poles, bifurcated more or less by a single slot substantially as at present used in fan-motors of the "split-phase" type, the method of changing the frequency upon which the motor is adapted to operate which consists in magnetizing several of the erstwhile poles magnetically the same, and thereby reducing the number of magnetic poles, and combining therewith "phase" or "teaser" coils of different size one within the other, and displaced in angular position about ninety degrees or a little less, substantially as specified.

In testimony whereof I affix my signature in presence of two witnesses.

PENROSE E. CHAPMAN.

Witnesses:
ALFRED A. EICKS,
JOHN C. HIGDON.